Figure 1:
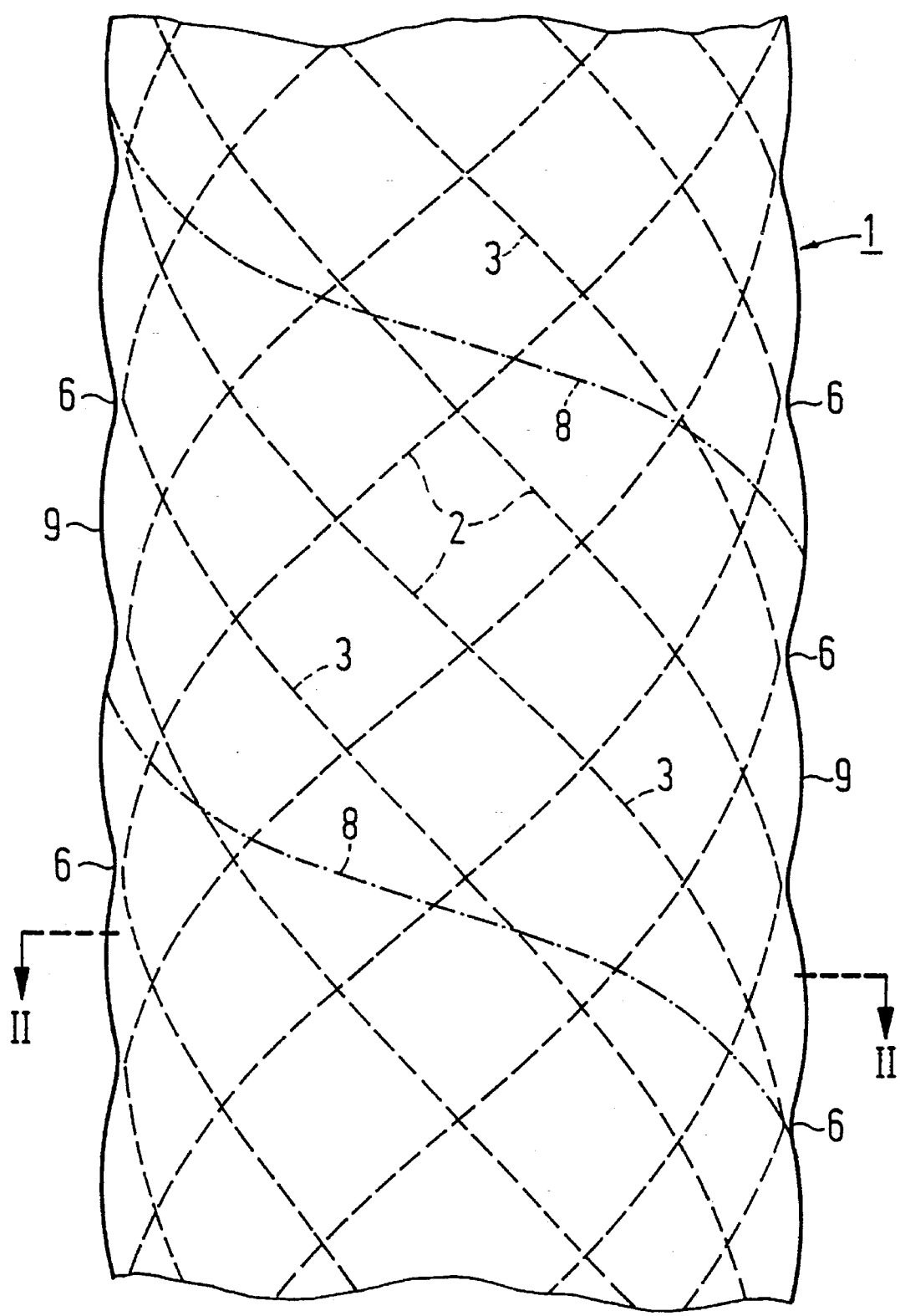

United States Patent
Waidele et al.

[11] Patent Number: 5,555,913
[45] Date of Patent: Sep. 17, 1996

[54] PLASTIC HOSE WITH A COLORED AND/OR METALLIZED SURFACE

[75] Inventors: Armin Waidele, Lauterbach; Dieter Katzer, Haslach, both of Germany

[73] Assignee: Hans Grohe GmbH & Co. KG, Germany

[21] Appl. No.: 406,042

[22] Filed: Mar. 17, 1995

[30] Foreign Application Priority Data

Jun. 1, 1994 [DE] Germany ............ 44 19 120.0

[51] Int. Cl.$^6$ ............................................. F16L 55/00
[52] U.S. Cl. ................ 138/104; 138/137; 138/178; 138/140
[58] Field of Search ............... 138/104, 36, 103, 138/177, 178, 137, 140, 145, 146, DIG. 10; 116/208; 406/34, 191, 193

[56] References Cited

U.S. PATENT DOCUMENTS

| | | | |
|---|---|---|---|
| 4,244,693 | 1/1981 | Guon | 23/230 L |
| 4,474,217 | 10/1984 | DeMarse et al. | 138/104 X |
| 4,523,141 | 6/1985 | Thomas et al. | 138/104 X |
| 5,228,478 | 7/1993 | Kleisle | 138/104 |
| 5,411,777 | 5/1995 | Steele et al. | 138/104 X |

FOREIGN PATENT DOCUMENTS

| | | |
|---|---|---|
| 0512412 | 11/1992 | European Pat. Off. . |
| 2552508 | 5/1977 | Germany ............ 138/104 |
| 7714185.6 | 8/1977 | Germany . |

OTHER PUBLICATIONS

European Patent Application 0058653 Anderson, Ralf 08–1982.
International PCT Application WO 94/02772 Doan, T. et al 02–1994.

*Primary Examiner*—Patrick Brinson
*Attorney, Agent, or Firm*—Eckert Seamans Cherin & Mellott

[57] ABSTRACT

The invention relates to a plastic hose with a coloring and/or metallization on its surface, which is produced by stamping on a hot stamping film, as well as to a process for the production thereof. As a result of the hot stamping full-surface colored or metallized surfaces can be created for plastic hoses.

19 Claims, 3 Drawing Sheets

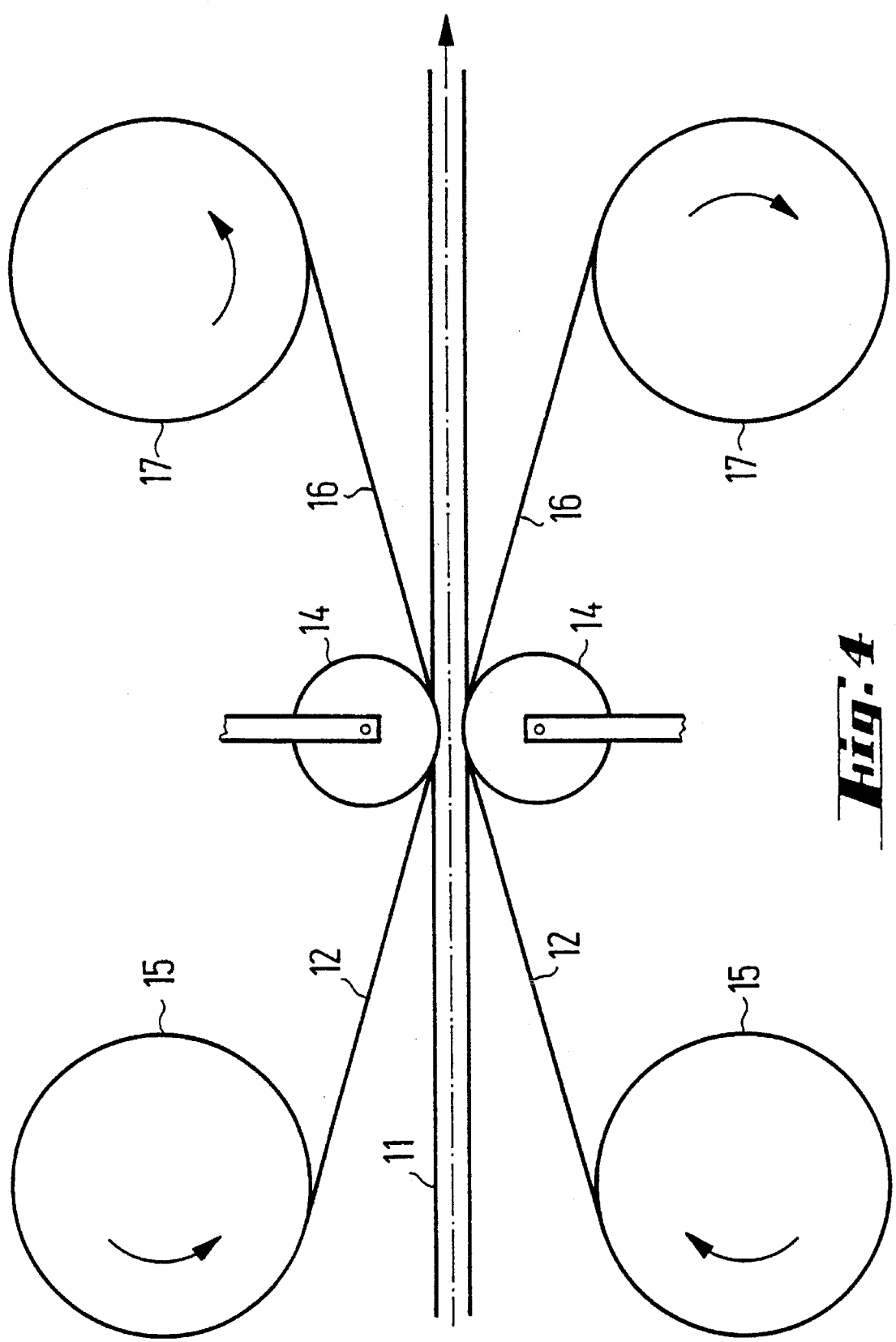

PLASTIC HOSE WITH A COLORED AND/OR METALLIZED SURFACE

The invention relates to a plastic hose, such as a sanitary hose and the like, having a colored and/or metallized surface. Plastic hoses have largely replaced in the sanitary field the conventional metal hoses with an inner rubber hose. However, the original chrome color of the metal hoses is still popular in the case of plastic hoses, particularly because numerous sanitary fittings are made from chromium-plated brass or chrome-colored plastic. In the case of double-walled shower hoses with a reinforcing coil or helix the chrome or chromium effect can be produced by constructing the reinforcing coil in strip-like manner and covering its surface with a small, metallized decorative strip. A permanent union between the reinforcing coil and the loosely engaging decorative strip can be brought about in that both are covered with a flexible plastic. Such double-walled shower hoses do not permit a full-surface metallization and also have a relatively complicated structure. It is therefore desirable to provide surface-colored and/or metallized plastic hoses, in which the coloring or metallization is not bound by certain constructional features.

According to the invention the plastic hose has at least one hot stamping film as a carrier for the varnish color and/or metallization and which is connected to an at least partly externally visible hose outside. Hot stamping films are thin, heat-active adhesive coatings, which have on one side a metallization or coloring and can be applied to surfaces by using heat and pressure. The metallized or colored surface of the adhesive coating is often covered with a protective varnish. The protective varnish is preferably a clear varnish. The protective varnish can be colored in order to give the metallized and/or colored surface desired coloring effects. Thus, in the case of an identical metallization, e.g. of aluminium, by coloring the clear varnish it is possible to imitate the colors of other metals such as e.g. chromium, brass and copper. The connecting fittings, e.g. of a shower hose, can then have the same color. For performing the hot stamping the hot stamping film is located on a carrier strip, which is removed after stamping on the hot stamping film. Normally between the carrier strip and the metallization or protective varnish there is a separating layer, which permits a problem-free removal of the carrier strip.

According to the invention it is preferable for the hot stamping film to completely cover the outside of the hose. It has surprisingly been found that the hot stamping film stamped onto the outside of the hose with its colored and/or metallized coating follows the movements of the hose, particularly expansions and compressions of hose portions, without suffering from cracks or creases. The hot stamping film connected to the hose is consequently an integral part of the hose material. The hot stamping film can form the outer surface of the hose. As the metallization or coloring are very thin and therefore very sensitive, the hot stamping film is provided in preferred manner with at least one protective coating, e.g. an afore-mentioned protective varnish. However, particularly in the case of mechanical stressing of the hose a more extensive surface protection is provided. This can be formed by an at least zonally transparent and/or translucent protective film. Such a protective film is advantageously an extruded on hose film. Such a hose film can have a material thickness of 0.1 to 1 mm or more and advantageously forms the outer hose of a multilayer and in particular double-walled plastic hose. The extruded on hose film can only mechanically surround the hose provided with the hot stamping film without adhering to the latter. This is in particular the case if the surface of the hot stamping film has residues of the separating agent. In such a case the extruded on hose film can be displaceable relative to the hot stamping film in the case of hose bending. This can be desirable for obtaining a good hose flexibility. However, it is also possible to apply the outer protective film or hose film in such a way that there is an adhesive connection with the surface of the hot stamping film.

The material thickness of the hot stamping film is generally extremely small and can be in the range 2 to 20 μm and in particular 3 to 5 μm. A coating thickness of 0.02 to 0.03 μm is adequate for the metallization or coloring. The adhesive coating can be in one or multiple layer form and as a rule coating thicknesses of 1.5 to 3 μm are sufficient. The material of the adhesive coating is adapted to the generally thermoplastic material of the hose in order to obtain a good adhesive connection. If such a protective varnish is provided, it can have a thickness of 1 to 1.5 μm. As a result of these limited layer thicknesses it is clear that the hot stamping film has an extremely limited mechanical strength and consequently adapts to the mechanical characteristics of the plastic hose.

The hot stamping film is advantageously strip-like. It can be placed longitudinally on the hose, particularly in the form of several par- allel-directed strips. However, a helically directed arrangement on the hose is also possible. The hot stamping films can be placed on the hose with a reciprocal overlapping of their edges. This is particularly preferred in the case of hot stamping films with a limited material thickness, because then the thickening through the overlap is not noticeable. The hot stamping films can also be positioned in such a way that the edges are arranged in jointless, abutting manner with respect to one another and are bonded or welded together at the abutment points. Such an arrangement is preferred with hot stamping films in which a reciprocal overlap of the edges would lead to a noticeable material thickening. The width of a strip of the hot stamping film is preferably of the same order of magnitude as the hose diameter. With such a width there is no problem in stamping the strip onto the hose, particularly with a helical film strip configuration. With a longitudinal arrangement of hot stamping films on the hose two to six, particularly two to four film strips are juxtaposed in parallel. Also in the case of a helical configuration several film strips, particularly two to three such strips can be juxtaposed.

Into the plastic hose can be incorporated in per se known manner textile, particularly multifilament reinforcing threads. Particularly if the plastic hose is constructed as a pressure hose, the reinforcing threads can be used both for increasing the longitudinal and the diametral stability. For this purpose groups of parallel reinforcing threads can be helically wound in clockwise and counterclockwise manner around the hose or can be embedded therein. The reinforcing threads of the clockwise and counterclockwise coils can cross in a crossing angle of approximately 90°. Particularly if the reinforcing threads are embedded into the hose material, the threads of the one winding direction can be located over the threads of the other winding direction, no reciprocal entwining being necessary. Advantageously the structure of the textile reinforcing threads is visible and/or perceptible on the hose surface. Particularly if the reinforcing threads are located below the hot stamping film, as is generally the case, the hose is given an optical vitality, which also reveals its strength. The hose can be constructed as a relatively thick-walled and substantially pressure-resistant carrier hose, which is surrounded by the hot stamping film and optionally provided textile reinforcing threads are advantageously embedded in the carrier hose material. The carrier hose provided with the hot stamping film can then be surrounded by an additional, thin outer hose. The material thickness of the carrier hose or inner hose can be 1 to 4 mm, particularly approximately 2.5 mm. The material thickness of the outer hose is preferably between 0.3 and 1 mm. The plastic hose according to the invention can advantageously be constructed as a flexible shower hose and has suitable connecting pieces at its ends. However, it is also possible to use the plastic hose according to the invention purely as a decorative hose for covering lines, such as tube and hose lines. Such a decorative hose can have a relatively thin wall and be unstable, because it need not be self-supporting. Its total wall thickness can be below 1 mm.

The invention also relates to a process for the production of the plastic hose according to the invention. This process is characterized in that a prefabricated plastic hose has its outside covered with at least one hot stamping film connected to a carrier web and the film is connected by heat and pressure action in full-surface, firm manner to the outside of the hose and the carrier web is subsequently drawn off.

Hot stamping films are generally applied to firm and in particular planar or flat surfaces. Plastic hoses, particularly flexible plastic hoses are unstable substrates having a convex surface. However, it has been found that flexible plastic hoses can be metallized or colored by hot stamping if at least during the application and stamping on of the hot stamping film they are in a substantially pressure-stable form. Such a pressure-stable form can be obtained by using a plastic hose which, due to its stability and in particular material strength and/or wall thickness, is substantially pressure-stable. With unstable hoses or if a pressure stability increase is desired, an internal pressure, particularly a gas internal pressure can be applied to the plastic hose. As a function of the hose type, temperature and stamping pressure, said pressure can be approximately 1 to 5 bar. As a result the necessary contact pressure during the hot stamping process can be obtained. The hot stamping is preferably performed continuously by moving the hose relative to a hot stamping tool. A linear movement between the hot stamping tool and the hose permits a full-surface stamping on of the hot stamping film, whilst avoiding air inclusions. For hot stamping purposes the hose can be drawn through a substantially fixed stamp die. For hot stamping use can be made of hot stamping rollers, which preferably have a substantial linear contact with the hot stamping film and the plastic hose. The hot stamping rollers can rotate helically relative to the hose. For a linear hot stamping several longitudinally positioned hot stamping rollers can be provided, which are mutually displaced laterally and axially. Following the application of the hot stamping film or films an encasing hose made from transparent and/or translucent material can be extruded onto the plastic hose provided with the hot stamping film.

The plastic hose to be provided with the hot stamping film can be removed from a supply roll. However, it is also possible directly prior to the hot stamping to produce the plastic hose by the extrusion of a thermoplastic material, particularly PVC, optionally embed the reinforcing threads in the still soft plastic material and then provide the freshly formed, stiffened, but still warm plastic hose with the hot stamping film.

Through a special microstructure of the hot stamping film, in the case of the hose according to the invention special optical effects can be obtained. This microstructure can be formed beforehand on the hot stamping film before it is connected to the carrier hose. Preferably the microstructure is formed during the production of the hose, particularly during the hot stamping. The hot stamping film applied to the carrier hose can have ultrafine, linear depressions and/or elevations, which can be caused by different relative shrinking or expanding processes between the hot stamping film and the carrier hose. If this microstructure is produced before an outer hose is extruded on, as is generally the case, then the inside of the outer hose can have a negative shape of the microstructure of the hot stamping film, so that the optical effects are reinforced, e.g. by optical reflection and lens effect on the inner face of the extruded on outer hose. Thus, in an embodiment of the invention the metallized and/or colored surface layer of the hot stamping film, including any coating varnish present, can have an irregular crack formation in the form of ultrafine hairline cracks, which are in part parallel and in part cross one another. This cracking can be brought about in that the hot stamping film shrinks after the stamping process, so that the metallized or colored layer also performs the shrinking, accompanied by cracking. Under considerable magnification the microstructure appears like the earth's crust which has dried out accompanied by cracking, or fingerprints. Such a fine microstructure in particular in conjunction with a metallized hot stamping film can give the hose the appearance of wire brush-finished metal surfaces. Such effects produced by hairline cracks or other ultrafine breaks in the metallization and/or coloring can be reinforced by making the carrier hose from colored and in particular black material, because then the basic color of the inner hose material can shine through the breaks. The size of the breaks can be kept so small that they are below the resolving power of the eye, so that the shining through of the substrate is merely detectable as a color glimmer.

Further features of the invention can be gathered from the following description of preferred embodiments in conjunction with the drawings and claims. The individual features can be implemented singly or in combination. In the drawings show:

FIG. 1 a view of a portion of a plastic hose according to the invention.

Figure 2:
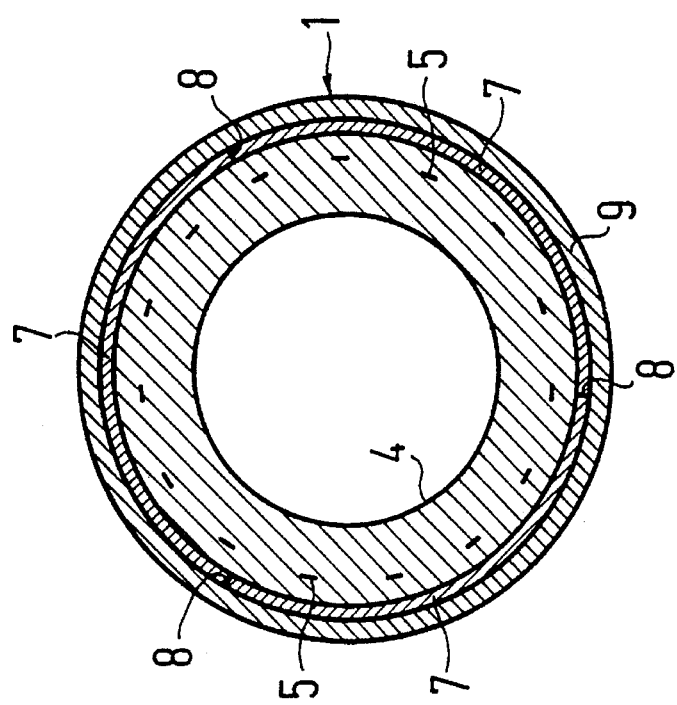

FIG. 2 a cross-section through the embodiment of FIG. 1 along line II—II.

Figure 3:
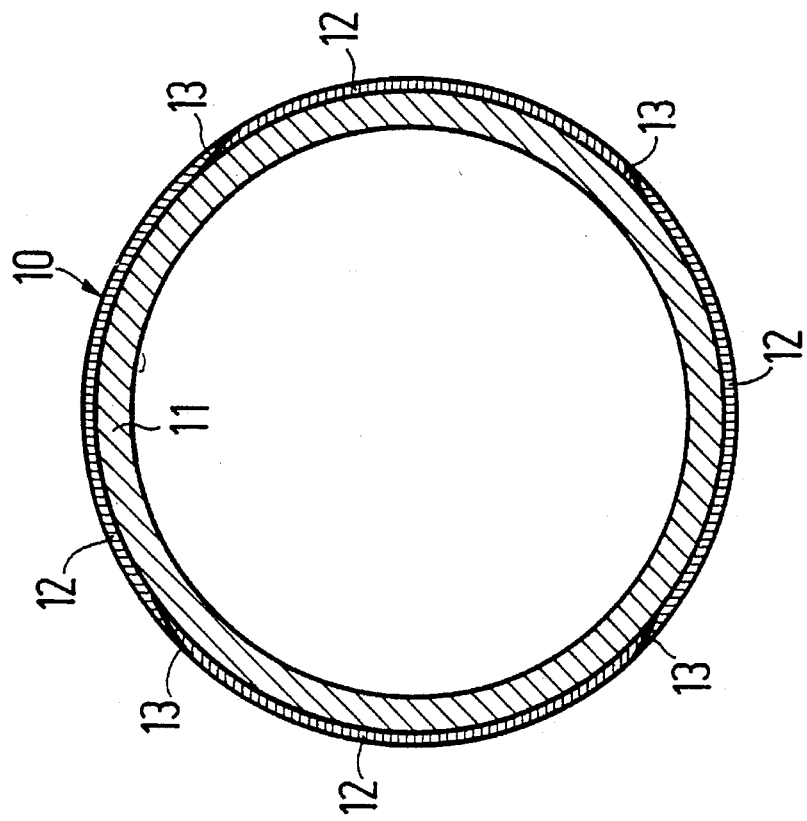

FIG. 3 a cross-section through another embodiment of the invention.

FIG. 4 a diagrammatic representation of a stamping station.

FIGS. 1 and 2 show a flexible, plastic, sanitary shower hose 1, which has a shining surface and in full-surface manner is given a metallic, silvery, chrome-glittering finish. It is provided on its surface with a weak structure of crossing, helically directed depressions 2, which can be attributed to a textile thread reinforcement 3 incorporated into the interior. The shower hose 1 is constructed as a double-walled hose with a diameter of approximately 15 mm. An inner carrier hose 4 has a relatively thick wall and a wall thickness of approximately 3 mm. It is produced by extrusion from thermoplastic material, e.g. flexible PVC (polyvinylchloride). The thread reinforcement 3 is embedded in the material of the inner carrier hose 4. In the represented embodiment for this purpose multifilament threads 5 with a crossing, helical configuration are pressed into the still soft material during extrusion. The embedding depth of the thread reinforcement is approximately ¼ of the wall thickness of the carrier hose 4, i.e. approximately ¾ of the wall thickness of the carrier hose is within the thread reinforcement and ¼ of the wall thickness outside the thread reinforcement. Due to the pressing in of the multifilament threads 5, the carrier hose 4 has slight, channel-like depressions 6 along the thread path so as to form the structure 2.

Onto the outer surface of the inner carrier hose 4 are stamped in full-surface manner, accompanied by the formation of a firm connection, helically directed strips of stamping film 7. There are three strips 7 parallel to one another with jointlessly abutting edges 8. The wall thickness of the stamping film 7 is shown in exaggerated manner in the drawing and is only approximately 4 µm. The hot stamping film comprises an adhesive coating of a thermoplastic material with heat-active adhesion characteristics and having on its outside a metallization, e.g. an aluminium vapour deposition. For protecting the metallization and reinforcing the hose, the latter has an outer hose 9, which can also be made from flexible PVC and have a material thickness of approximately 0.6 mm, surrounding the hot stamping film 7. The outer hose is made from colorless, transparent material and gives the metallized surface of the carrier hose 4 a depth luster, which gives the hose an esthetically pleasing appearance. The outer hose 9 is located flush on the hot stamping film 7 without being surface-connected thereto. Thus, in the case of bending and compressing of the shower hose 1 it is displaceable to a limited extent relative to the carrier hose 4, which has a positive effect on the flexibility of the shower hose 1. As a result of the full-surface, firm connection to the carrier hose 4, the stamping film 7 is an integrated component thereof and accompanies the movements thereof, without the metallized coating forming creases or cracks.

As the shower hose walls are solid and have a substantially smooth outer surface, the shower hose can in simple manner be provided at its ends with connecting fittings for connection to sanitary equipment, without special precautions having to be taken for obtaining the necessary sealing of the connections.

FIG. 3 shows an embodiment of the invention in the form of a decorative hose 10. A thin-walled, flexible hose 11 of thermoplastic material, e.g. PVC, has a diameter of approximately 13 mm and a wall thickness of approximately 0.8 mm. On the outer surface of the thin-walled hose 11 four hot stamping film strips 12, which reciprocally overlap by their edges 13, run parallel to one another in the longitudinal direction of the hose. Here again the hot stamping film has a multilayer construction and has an adhesive coating of heat-active, thermoplastic material, whose outside is metallized by aluminum vapor deposition. The aluminum vapour deposition coating is provided with a protective coating, which is also of thermoplastic material and permits an overlapping connection of the edges 13 during hot stamping. The protective coating is transparent and can, if desired, be given a transparent coloring in order to give the metallization a color effect.

FIG. 4 diagrammatically shows a hot stamping station for producing the hose according to FIG. 3. The thin-walled hose 11 is drawn from a not shown supply roll and is internally subject to an air pressure of approximately 1 bar. It is passed between two facing stamping rollers 14, which are heated to approximately 160° C. and have on the outer circumference a concave taper corresponding to the hose radius. Two strip-like hot stamping films 12 are located on supply rolls 15 and stored on carrier films 16. The strips of the hot stamping film 12 stored on the carrier film 16 are drawn together with the thin-walled hose 11 between the stamping rollers 14, so that the hot stamping films 12 come into contact with the hose surface and are stamped onto it. As a result of the heat transfer the adhesive coating of the hot stamping films becomes active and creates a firm, surface connection of the hot stamping film to the hose surface. As a result of the substantially linear contact of the stamping rollers 14 with the outer surface of the thin-walled hose 11 in the stamping area and the rolling of the film onto the hose outer surface, a full-surface connection is obtained, whilst avoiding air inclusions. After leaving the stamping zone the empty carrier film is removed from the hot stamping film and wound onto film rolls 17 for the empty carrier film. Displaced by 90° at a distance from the first stamping station, is provided a second stamping station having an identical construction and which stamps two further strips of hot stamping film onto the still free lateral faces of the hose 11. The width of the strips is greater than ¼ of the outer circumference of the thin-walled hose 11, so that the strips are stamped on with a mutual overlap. This permits a full-surface metallization of the hose. In special cases, if desired, only a partial metallization of the hose is possible. For this purpose use can be made of stamping dies or rollers, which have a structured stamping face with elevations and depressions. In this way inscriptions and/or pictures can be produced on the hose. In a similar manner several impressions can be successively stamped on in time-shifted manner with different hot stamping films and a reciprocal displacement of the printed impression, in order to produce specific patterns. If desired, after hot stamping, the hose can be provided with an additional protective coating on the surface, particularly by extruding on.

We claim:

1. Plastic hose with a colored surface, at least one hot stamping film being provided as a carrier for the color and is connected to an at least partly externally visible outside surface of the hose, and wherein edges of the hot stamping film are arranged in mutually overlapping manner on the hose.

2. Plastic hose according to claim 1, wherein the color is at least partly formed by a metallization.

3. Plastic hose according to claim 1, wherein the hot stamping film completely covers the outside of the hose.

4. Plastic hose according to claim 1, wherein the color-carrying hot stamping film is covered with a protective coating.

5. Plastic hose according to claim 1, wherein the hot stamping film is covered with an at least zonally transparent or translucent protective film.

6. Plastic hose according to claim 1, wherein a hose film is extruded over the hot stamping film.

7. Plastic hose according to claim 5, wherein the protective film forms an outer hose of an at least double-walled plastic hose.

8. Plastic hose according to claim 1, wherein the hot stamping film (without film carrier) has a thickness of 2.0 to 20 µm.

9. Plastic hose according to claim 1, wherein the hot stamping film is placed in the form of strips on the hose.

10. Plastic hose according to claim 1, wherein the hot stamping film is placed in axially directed manner on the hose.

11. Plastic hose according to claim 1, wherein the hot stamping film is placed helically on the hose.

12. Plastic hose according to claim 1, wherein edges of the hot stamping film are arranged substantially jointlessly in abutting manner.

13. Plastic hose according to claim 9, wherein the strips of the hot stamping film have a width approximating a diameter of the hose.

14. Plastic hose according to claim 9, wherein the hot stamping film strips are positioned longitudinally, two to six film strips being juxtaposed in parallel.

15. Plastic hose according to claim 1, wherein the hot stamping film defines a microstructure.

16. Plastic hose according to claim 1, comprising an inner hose constructed as a substantially pressure-resistant carrier hose, which is surrounded by the hot stamping film.

17. Plastic hose according to claim 1, wherein the hose is constructed as a pressure hose.

18. Plastic hose according to claim 1, wherein the hose is constructed as a shower hose.

19. Plastic hose according to claim 1, wherein the hose is a flexible, thin-walled decorative hose.

* * * * *